United States Patent
Hsu et al.

(10) Patent No.: US 8,053,486 B2
(45) Date of Patent: Nov. 8, 2011

(54) COATING COMPOSITIONS AND CURING METHOD THEREOF

(75) Inventors: Lung-Lin Hsu, Kaohsiung (TW); Sue-Hong Liu, Kaohsiung (TW)

(73) Assignee: Eternal Chemical Co., Ltd., Kaohsiung (TW)

( * ) Notice: Subject to any disclaimer, the term of this patent is extended or adjusted under 35 U.S.C. 154(b) by 130 days.

(21) Appl. No.: 12/339,621

(22) Filed: Dec. 19, 2008

(65) Prior Publication Data

US 2009/0163614 A1   Jun. 25, 2009

(30) Foreign Application Priority Data

Dec. 24, 2007   (TW) .................................. 96149732 A

(51) Int. Cl.
*C09D 125/00* (2006.01)
*C09D 131/00* (2006.01)
*C09D 133/00* (2006.01)

(52) U.S. Cl. ................ 522/42; 522/44; 522/64; 522/79; 522/80; 522/83; 522/114; 522/116; 522/117; 522/120; 522/121; 522/122; 522/125

(58) Field of Classification Search .................... 522/79, 522/80, 83, 42, 44, 64, 114–121, 122–125
See application file for complete search history.

(56) References Cited

U.S. PATENT DOCUMENTS

| | | | | |
|---|---|---|---|---|
| 3,957,918 A * | 5/1976 | Dickie et al. | ................ | 525/287 |
| 4,339,474 A * | 7/1982 | Kishida et al. | ................ | 427/515 |
| 4,902,578 A * | 2/1990 | Kerr, III | ........................ | 428/522 |
| 5,922,473 A * | 7/1999 | Muthiah et al. | ................ | 428/481 |
| 6,332,291 B1 | 12/2001 | Flosbach et al. | | |
| 7,527,864 B2 * | 5/2009 | Miller | ........................ | 428/423.1 |
| 7,591,429 B2 * | 9/2009 | Ozaki et al. | ................ | 235/462.1 |
| 7,754,827 B2 * | 7/2010 | Weikard et al. | ............... | 525/452 |
| 2005/0209358 A1 | 9/2005 | Miller | | |
| 2006/0128923 A1 | 6/2006 | Roesler | | |
| 2007/0082967 A1 | 4/2007 | James et al. | | |
| 2007/0284775 A1 * | 12/2007 | Koniger et al. | .......... | 264/173.13 |
| 2008/0311351 A1 | 12/2008 | Hsu et al. | | |

FOREIGN PATENT DOCUMENTS

| | | |
|---|---|---|
| CA | 2102169 A1 | 5/1994 |
| CN | 1886463 A | 12/2006 |
| DE | 42 37 490 A1 | 5/1994 |
| DE | 198 18 735 A1 | 10/1999 |
| DE | 10 2008 028 063 A1 | 1/2009 |
| DE | 10 2007 061 012 A1 | 6/2009 |
| TW | 200636024 | 12/2006 |

OTHER PUBLICATIONS

Korean Action Mailed Dec. 15, 2010 for Application No. 2008-0132817.
English abstract of DE 10 2007 061 012 A1, Jun. 2009.
Espacenet English abstract of DE 42 37 490 A1, May 1994.
Espacenet English abstract of DE 198 18 735 A1, Oct. 1999.
Espacenet English abstract of DE 10 2008 028 063 A1, Jan. 2009.
Office Action in Chinese Application 2008100007819.
Espacenet Bibliographic Data of China Application 1886463A Published Dec. 27, 2006.

* cited by examiner

*Primary Examiner* — Susan W Berman
(74) *Attorney, Agent, or Firm* — Ladas & Parry LLP

(57) ABSTRACT

The invention provides a coating composition comprising a thermal plastic resin selected from the group consisting of a polycycloolefin resin, polyester resin, polyacrylate resin, and a mixture thereof; and a radiation curable resin comprising a radiation polymer containing at least one mono- or multi-functional acrylic acid based monomer as a polymerization unit, an oligomer containing an ethylenically unsaturated functional group, and a photoinitiator, wherein the radiation curable resin is used in an amount of 220-1000% by weight on the basis of the weight of the thermal plastic resin. The invention improves the hardness of the coating composition, prevent the coated substrate from being scratched or impaired, and impart the substrate with high transparency without causing warping problem.

17 Claims, No Drawings

COATING COMPOSITIONS AND CURING METHOD THEREOF

BACKGROUND OF THE INVENTION

1. Field of the Invention

The present invention relates to a coating composition. The inventive composition can be applied to a substrate, particularly a plastic substrate for optical applications, to enhance the hardness of the substrate and prevent the substrate from being scratched.

2. Description of the Prior Art

Due to careless operations, the surfaces of substrates are easily be scratched or worn, which adversely affects the appearance and properties of the substrates. Particularly, optical substrates are often impaired by the vibration during transportation. Presently, the solution adopted in the industry is to adhere a protective film to the surface of a substrate. Nevertheless, the utilization of a protective film will increase the cost. To overcome the above drawback, a helpful approach would be to apply a coating to the surface of a substrate to enhance the hardness of the substrate and prevent the surface of the substrate from being scratched. In the past, UV curable resins were normally used as scratch-resistant coatings because they can react in a short time and achieve a degree of crosslinking. However, the utilization of UV curable resins is limited by insufficient UV light transmission, which may result in a non-cure or an incomplete cure. Moreover, due to a crosslinking reaction, UV curable resins are subject to inconsistent stresses or shrinkage rates and easy to warp or crack.

In order to address the problems associated with the UV light transmission and non-cure or incomplete cure in conventional photo-curing techniques, and due to the fact that thermally curable resins cure in a prolonged time, CN10106347A (US2007/0066698 A1) discloses a dual cure composition which comprises at least one filler, at least one curable monomer comprising at least one of an ethylenic unit or cyclic ether unit or mixture thereof, at least one photoinitiator; and at least one thermal initiator. CN10106347A discloses exposing the dual cure composition to radiation to at least partially photocure, and providing sufficient heat to initiate thermal curing so as to obtain a cured composition.

U.S. Pat. No. 5,571,297 also discloses a dual cure binder system to address the problems associated with conventionally used phenolic resin that has excellent adhesion property but needs a prolonged heating to achieve thermal curing, and to obviate the above-mentioned drawbacks associated with the photocure. U.S. Pat. No. 5,571,297 discloses a coated abrasive with a binder coat which comprises a compound having at least one function that is radiation curable and at least one function that is polymerizable under thermally activated conditions to achieve the desired effects.

Incorporating a certain amount of a thermally curable resin into a coating that contains a UV curable resin and utilize a dual cure process to effectively generate a coating with a low degree of crosslinking is already known in the art. For example, DE 19920799, U.S. Pat. Nos. 4,025,407, and 6,835,759 have disclosed such technique. Normally, the thermally curable resins used are thermal setting resins. These thermal setting resins have a great internal stress and cannot fully solve the problem associated with warping. In addition, the curing of a thermal setting resin normally requires a curing agent (or a crosslinker). However, curing agents react with the thermal setting resin easily, thereby increasing the molecular weight of the resin over time or resulting in different extents of reaction, and changing the properties of the resin. In this case, the resin should be consumed in a limited period and is not suitable for long-time coating.

U.S. Pat. No. 6,835,759 discloses a coating composition comprising a radiation curable component (a1), a thermally curable binder component (a2), a thermally curable crosslinking compound (a3), and optionally, one or more reactive diluents (a4) in a ratio that is obtained by the following equation: UV/TH=[a1+a4]NV/[a2+a3]NV. wherein [a1+a4]NV refers to the total nonvolatile weight of components (a1) and (a4). and [a2+a3]NV refers to the total nonvolatile weight of components (a2) and (a3). In a preferred embodiment, when UV/TH is from 0.25 to 0.50, most preferably from 0.30 to 0.45, the surface defects caused by vaporous emissions can be reduced and a desirable adhesion, particularly an especially desirable balance between porosity sealing and adhesion, can be further obtained. However, when the ratio UV/TH is within the above-mentioned ranges, the hardness and thus the scratch resistance of the coating composition may not be sufficient for practical applications.

Moreover, for easy processability, commonly used dual cure resins have a lower glass transition temperature, which is normally lower than 70° C. Although the resins with a lower glass transition temperature can be processes more easily, they exhibit poor heat resistance. Compared with the resins with a lower glass transition temperature, those with a higher glass transition temperature are more stable and more heat resistant, particularly when the resins are used in optical films or other components that will be affected by the light or heat from a lamp. When the temperature is up to 80° C., the form of the material is changed. Consequently, it is necessary to use the resins that have a higher glass transition temperature and a better heat resistance.

SUMMARY OF THE INVENTION

The present invention provides a coating composition comprising:
(a) a thermal plastic resin selected from the group consisting of a polycycloolefin resin, polyester resin, polyacrylate resin, and a mixture thereof; and
(b) a radiation curable resin comprising:
  (b1) a radiation polymer containing at least one mono- or multi-functional acrylic acid based monomer as a polymerization unit;
  (b2) an oligomer having an ethylenically unsaturated group; and
  (b3) a photoinitiator,
wherein the radiation curable resin is used in an amount of 220-1000% by weight on the basis of the weight of the thermal plastic resin.

The present invention selects thermal plastic resins as the thermally curable resins, which can buffer stress and enhance the adhesion of the radiation curable resin and provide the coating composition with a better coating property, thereby enhancing the processability of the resin and increasing the ratio of the amount of the radiation curable resin so as to enhance the hardness of the coating composition. When being applied to a substrate, the coating composition of the present invention, once being cured, can enhance the hardness of the substrate and prevent the substrate from being scratched or impaired and impart the substrate with high transparency without warping.

DETAILED DESCRIPTION OF THE INVENTION

The thermal plastic resin used in the coating composition of the present invention is selected from the group consisting of a polycycloolefin resin; a polyester resin, such as poly(ethylene naphthalate) (PEN); a polyacrylate resin, such as polymethyl methacrylate (PMMA); and a mixture thereof, of which the polyacrylate resin is preferred. The thermal plastic resin has at least one functional group selected from the group consisting of hydroxy, carboxy, amido, urethano, and epoxy, and a combination thereof.

According to one embodiment of the present invention, a polyacrylate resin is used as the thermal plastic resin, and the polyacrylate resin contains a polymerization unit derived from the monomer selected from the group consisting of acrylic acid, methacrylic acid, methyl acrylate, methyl methacrylate, ethyl acrylate, ethyl methacrylate, butyl acrylate, butyl methacrylate, iso-butyl acrylate, iso-butyl methacrylate, iso-octyl acrylate, iso-octyl methacrylate, cyclohexyl acrylate, cyclohexyl methacrylate, glycidyl acrylate, glycidyl methacrylate, hydroxyethyl acrylate, hydroxypropyl acrylate, 2-hydroxyethyl acrylate, 2-hydroxyethyl methacrylate, 2-hydroxypropyl acrylate, 2-hydroxypropyl methacrylate. and hydroxypropyl methacrylate and a mixture thereof, among which acrylic acid. methacrylic acid, methyl acrylate, methyl methacrylate, butyl acrylate, butyl methacrylate, isobutyl acrylate, iso-butyl methacrylate, hydroxyethyl acrylate, 2-hydroxyethyl acrylate, 2-hydroxyethyl methacrylate, 2-hydroxypropyl acrylate, and 2-hydroxypropyl methacrylate, and a mixture thereof are preferred.

The thermal plastic resin has a glass translation temperature of greater than 80° C., preferably from 80° C. to 250° C., and more preferably from 85° C. to 130° C.; and has an average molecular weight in the range from $10^4$ to $2\times10^6$, preferably from $1.5\times10^4$ to $3\times10^5$, and more preferably from $2\times10^4$ to $6\times10^4$.

The radiation curable resin according to the present invention refers to a resin that can be cured upon being irradiated with energetic rays. The energetic rays refer to a light source in a certain wavelength range, such as UV light, infrared light, visible light, or heat rays (nucleus rays or radiation rays), among which UV light is preferred. The intensity of the irradiation is in a range from 100 to 1000 mJ/cm$^2$, preferably from 200 to 800 mJ/cm$^2$.

The radiation curable resin used in the coating composition of the present invention comprises a radiation polymer, an oligomer having an ethylenically unsaturated group; and a photoinitiator. The radiation polymer contains at least one mono- or multi-functional acrylic acid based monomer as a polymerization unit and the acrylic acid based monomer is an acrylic acid monomer or an acrylate monomer. preferably an acrylate monomer. Suitable acrylate monomers for the present invention include acrylate monomers, methacrylate monomers, urethane acrylate monomers, polyester acrylate monomers, and epoxy acrylate monomers, among which acrylate monomers and methacrylate monomer are preferred.

The above-mentioned acrylate monomers can be selected from the group consisting of methyl acrylate, methyl methacrylate, butyl acrylate, 2-phenoxy ethyl acrylate, ethoxylated 2-phenoxy ethyl acrylate, 2-(2-ethoxyethoxy)ethyl acrylate, cyclic trimethylolpropane formal acrylate, β-carboxyethyl acrylate, lauryl(meth)acrylate, isooctyl acrylate, stearyl(meth)acrylate, isodecyl acrylate, isoborny(meth)acrylate, benzyl acrylate, hydroxypivalyl hydroxypivalate diacrylate, ethoxylated 1,6-hexanediol diacrylate, dipropylene glycol diacrylate, ethoxylated dipropylene glycol diacrylate, neopentyl glycol diacrylate, propoxylated neopentyl glycol diacrylate, ethoxylated bisphenol-A di(meth)acrylate, 2-methyl-1,3-propanediol diacrylate, ethoxylated 2-methyl-1,3-propanediol diacrylate, 2-butyl-2-ethyl-1,3-propanediol diacrylate, ethylene glycol dimethacrylate, diethylene glycol dimethacrylate, 2-hydroxyethyl methacrylate phosphate, tris(2-hydroxy ethyl)isocyanurate triacrylate, pentaerythritol triacrylate, ethoxylated trimethylolpropane triacrylate, propoxylated trimethylolpropane triacrylate, trimethylolpropane trimethacrylate, pentaerythritol tetraacrylate, ethoxylated pentaerythritol tetraacrylate, ditrimethylolpropane tetraacrylate, propoxylated pentaerythritol tetraacrylate, pentaerythritol tetraacrylate, dipentaerythritol hexaacrylate, (meth)acrylate, hydroxyethyl acrylate (HEA), 2-hydroxyethyl methacrylate (HEMA), tripropylene glycol di(meth)acrylate1,4-butanediol di(meth)acrylate, 1,6-hexanediol di(meth)acrylate, allylated cyclohexyl di(meth)acrylate, isocyanurate di(meth)acrylate, ethoxylated trimethylol propane tri(meth)acrylate, propoxylated glycerol tri(meth)acrylate, trimethylol propane tri(meth)acrylate, and tris(acryloxyethyl)isocyanurate, and a mixture thereof.

To enhance the film formation of the coating composition, the radiation curable resin according to the invention contains an oligomer having an ethylenically unsaturated group that has a molecular weight in the range from $10^3$ to $10^4$. Preferably, the oligomers are acrylate oligomers, which include, for example, but are not limited to, urethane acrylates, such as aliphatic urethane acrylates, aliphatic urethane hexaacrylates, and aromatic urethane hexaacrylates; epoxy acrylates, such as bisphenol-A epoxy diacrylate and novolac epoxy acrylate; polyester acrylates, such as polyester diacrylate; or homoacrylates or a mixture thereof.

The photoinitiators useful for the invention are those generating free radicals upon photoirradiation to induce polymerization through the transfer of free radicals. The photoinitiators useful in the invention include, for example, but are not limited to, benzophenone, benzoin, 2-hydroxy-2-methyl-1-phenylpropan-1-one, 2,2-dimethoxy-1,2-diphenylethan-1-one, 1-hydroxy cyclohexyl phenyl ketone, and 2,4,6-trimethylbenzoyl diphenyl phosphine oxide, and a mixture thereof. Preferably, the photoinitiator is benzophenone or 1-hydroxy cyclohexyl phenyl ketone.

The present invention selects thermal plastic resins as the thermally curable resins, which can buffer stress and enhance the adhesion of the radiation curable resin and provide the coating composition with a better coating property. thereby enhancing the processability of the resin and increasing the ratio of the amount of the radiation curable resin so as to enhance the hardness of the coating composition. The suitable amount of the radiation curable resin, as compared with the thermal plastic resin, depends on the desired product to be obtained. In order to enhance the hardness of the cured coating composition and to increase the scratch and wear resistance of the cured coating composition for its application to optical films without causing the films to warp, the radiation curable resin is used in an amount of 220-1000% by weight, preferably 250-500% by weight on the basis of the weight of the thermal plastic resin.

In addition to the thermal plastic resin and radiation curable resin. the coating composition of the present invention may optionally comprise the additives conventionally known to persons skilled in the art, which can be, for example, but are not limited to, an anti-static agent, a solvent, a photoinitiator, diffusion particles, a UV absorber, or inorganic particulates.

During the processing or fabrication of the coating composition, static electricity will be generated by the friction of the coating composition itself or between the coating composition and other materials, which makes the free dusts in the air aggregated on the surface, resulting in the damage of the expensive electronic devices, and even causing a fire hazard due to the ignition of the combustible gas or powder. Therefore, the coating composition of the present invention may optionally comprise an anti-static agent.

The anti-static agent can be directly incorporated into the coating composition and the resultant composition is further mixed and processed. The anti-static agent suitable for the present invention is not particularly limited, and can be any anti-static agent well known to persons having ordinary skill in the art, such as ethoxy glycerin fatty acid esters, quaternary amine compounds, aliphatic amine derivatives, epoxy resins (such as polyethylene oxide), siloxane, or other alcohol derivatives, such as poly(ethylene glycol) ester, poly(ethylene glycol) ether and the like. Normally, a plastic material has a surface resistivity in the range from $10^{15}$ to $10^{16}$ $\Omega/\square$ (i.e., $\Omega/m^2$). If an anti-static effect is desired, a surface resistivity in the range from $10^{10}$ to $10^{12}$ $\Omega/\square$ is preferred. However, when the surface resistivity is higher than $10^{12}$ $\Omega/\square$, the anti-static effect is not good.

Optionally, the coating composition of the present invention comprises a UV absorber. The UV absorber suitable for the present invention can be any UV absorber well known to persons having ordinary skill in the art, which includes, for example, a benzotriazole, a benzotriazine, a benzophenone, or a salicylic acid derivative. As an alternative, inorganic particulates that absorb UV light, such as zinc oxide, zirconia, silicon dioxide, titanium dioxide, alumina, calcium sulfate, barium sulfate, or calcium carbonate, or a mixture thereof, can be used in the coating composition. The particle size of the above-mentioned inorganic particulates is normally in the range from 1 to 100 nm (nanometers), preferably from 20 to 50 nm.

Optionally, the coating composition of the present invention comprises diffusion particles. The diffusion particles suitable for the present invention are well known to persons having ordinary skill in the art, which include, for example, the organic particles of an acrylate resin, a methacrylate resin, a styrene resin, a urethane resin, or a silicone resin, or a mixture thereof.

Optionally, the coating composition of the present invention comprises a solvent to improve the flowability of the composition so that the coating composition can be applied to a substrate more easily. The solvents useful for the present invention can be those well known to persons having ordinary skill in the art, which include, for example, a benzene compound, an ester, a ketone, or a mixture thereof Non-limiting examples of the benzene solvent include benzene, o-xylene, m-xylene, and p-xylene toluene, and a mixture thereof. Non-limiting examples of the ester solvent include ethyl acetate, butyl acetate, ethyl formate, methyl acetate. ethoxyethyl acetate, ethoxypropyl acetate, and monomethyl ether propylene glycol acetate, and a mixture thereof. Non-limiting examples of the ketone solvent include acetone, methyl ethyl ketone, and methyl isobutyl ketone, and a mixture thereof.

The amounts in weight percentage of the components of the inventive coating composition are not particularly limited, and preferably, are as follows: thermal plastic resin: 10-40%; radiation curable resin: 20-70%; anti-static agent: 3-5%; inorganic particulates: 0-16%; diffusion particles: 0-35%; solvent: 10-40%. The amounts in weight percentage of the components of the radiation curable resin are as follows: radiation polymer: 15-45% on the basis of the weight of the radiation curable resin; oligomer having an ethylenically unsaturated group: 30-50% on the basis of the weight of the radiation curable resin; photoinitiator: 2-10% on the basis of the weight of the radiation curable resin.

The coating composition of the present invention can be applied to the surface of a substrate by coating or adhesion, preferably by coating. The substrate is not particularly limited and the examples thereof include ceramic tile, wood, leather, stone, glass, metals, paper, plastic, fiber, cotton fabric, home appliance, lighting device, or computer case. Preferably, the substrate is a glass or plastic substrate, particularly the glass or plastic substrates for optical applications. According to an embodiment of the present invention, the inventive coating composition can be applied to light source devices, such as, advertising light boxes or flat panel displays, particularly the panel devices or backlight modules of liquid crystal displays (LCD), by a coating or adhesion method, preferably by a coating method, so as to form a scratch resistant layer on the surface of the substrate. When the inventive coating composition is applied to an optical substrate, the surface of the resultant coated substrate is flat without warp, so that the optical properties will not be adversely influenced.

The above-mentioned plastic substrate is not particularly limited and can be, for example, a polyester resin, such as polyethylene terephthalate (PET) or polyethylene naphthalate (PEN); a polyacrylate resin, such as polymethyl methacrylate (PMMA); polyimide resin; a polycycloolefin resin; a polycarbonate resin; a polyurethane resin; triacetate cellulose (TAC); or polylactic acid (PLA) fiber or a mixture thereof. The preferred substrates are those formed from polyethylene terephthalate, polymethyl methacrylate, polycycloolefin resin, or triacetate cellulose. or a mixture thereof. More preferably, the substrate is polyethylene terephthalate. The thickness of the substrate typically depends on the requirement of the desired optical product, and is preferably in a range from about 16 μm to about 350 μm.

The coating composition of the present invention can be cured by a dual cure method with both radiation and heat. By this dual cure, the warping problem associated with the coated substrate caused by an extremely great internal stress due to a rapid curing can be avoided as the shrinkage rate can be effectively controlled. The coating composition of the present invention exhibits the properties of high strength, good toughness, heat resistance, and high hardness, and has a pencil hardness of 3H or more as measured according to JIS K5400 standard method.

The coating composition of the present invention can be prepared by mixing the above-mentioned components in a suitable ratio in, for example, an agitator, a dissolver, a homogenizer, or a dispersion mixer.

The coating composition of the present invention can be cured by any curing method well known to persons having ordinary skill in the art, in which the order of the curing with radiation and the curing with heat is not particularly limited. For example, a coating composition containing the above-mentioned components is prepared and provided with sufficient heat. Alternatively, the coating composition can be applied to a substrate mentioned above, and the coated substrate is provided with sufficient heat. If the coating composition contains a solvent, the coating composition or the coated substrate can be put into an oven to evaporate the solvent, and is heated to a temperature higher than the glass transition temperature of the thermal plastic resin and heated at such temperature for several minutes to cure the composition. Thereafter, the coating composition or the coated substrate is exposed to the energetic rays from a radiation source to result in a radiation polymerization. Suitable radiation sources include UV light, visible light, and high energy rays (electron beam), among which UV light is preferred. The intensity of the energetic rays is in the range from 200 to 800 $mJ/cm^2$.

According to another embodiment of the present invention, the above-mentioned coating composition or coated substrate is first exposed to the energetic rays from a radiation source to result in a radiation polymerization. The intensity of the energetic rays is in the range from 200 to 800 mJ/cm$^2$. Thereafter, a sufficient amount of heat is provided to the coating composition or coated substrate to heat the coating composition or coated substrate to a temperature higher than the glass transition temperature of the thermal plastic resin, and the coating composition or coated substrate is heated at such temperature for several minutes.

If desired, the above-described steps can be repeated to afford a multi-layered coating.

The following examples are used to further illustrate the present invention, but not intended to limit the scope of the present invention.

PREPARATION EXAMPLE 1

Formulating radiation curable resin formulation A: In a 250 mL glass bottle, 15 g ethyl acetate was added. With high speed stirring, the following acrylate monomers: 10 g dipentaerythritol hexaacrylate, 2 g trimethylol propane trimethacrylate, 14 g pentaerythritol triacrylate, and an oligomer: 34.5 g of an aliphatic urethane hexaacrylate [Etercure 6415-100, Eternal Co.], and a photoinitiator: 4.5 g 1-hydroxy cyclohexyl phenyl ketone were added in sequence to provide 100 g of radiation curable resin formulation A with a solids content of about 80%.

EXAMPLE 1

The Amount of Radiation Curable Resin (24.86×80%) is 220 wt % on the Basis of the Amount of Thermal Plastic Resin (30.14×30%)

Preparation of Scratch-Resistant Layer

To a 250 ml glass bottle, 25 g ethyl acetate was added as a solvent. With high speed stirring, the following substances were added in sequence: 24.86 g of the radiation curable resin formulation A prepared in Preparation Example 1 (with a solids content of about 80%, Eternal Company); a thermal plastic resin: 30.14 g of polymethacrylic polyol resin [Eterac 7365-s-30, Eternal Company] (with a solids content of about 30%, and a glass transition temperature Tg of 95° C.); and 4.2 g of an anti-static agent [GMB-36M-AS, Marubishi Oil Chem. Co., Ltd] (with a solids content of about 20%) to prepare a coating composition with a total weight of about 85 g and solids content of about 30%. The coating composition was coated on a PET substrate of 188 μm in thickness with a RDS Bar Coater #8, dried at 100° C. for 1 minute, then dried by being exposed in a UV exposure machine [Fusion UV, F600V, 600 W/inch, H type lamp source] at a power set at 100%, at a speed of 15 m/m in with an energetic ray of 250 mJ/cm$^2$, and at room temperature for 4 seconds, to afford a scratch-resistant layer with a coating thickness of about 6 μm. The scratch-resistant layer was tested for various properties, and the test results obtained are shown in Table 1 below.

EXAMPLE 2

The Amount of Radiation Curable Resin (29.12×80%) is 300 wt % on the Basis of the Amount of Thermal Plastic Resin (25.88×30%)

Preparation of Scratch-Resistant Layer

To a 250 ml glass bottle, 25 g ethyl acetate was added as a solvent. With high speed stirring, the following substances were added in sequence: 29.12 g of the radiation curable resin formulation A prepared in Preparation Example 1 (with a solids content of about 80%, Eternal Company); a thermal plastic resin: 25.88 g of polymethacrylic polyol resin [Eterac 7365-s-30, Eternal Company] (with a solids content of about 30%, and a glass transition temperature Tg of 95° C.); and 4.2 g of an anti-static agent [GMB-36M-AS, Marubishi Oil Chem. Co., Ltd] (with a solids content of about 20%) to prepare a coating composition with a total weight of about 85 g and solids content of about 30%. The coating composition was coated on a PET substrate of 188 μm in thickness with a RDS Bar Coater #8, dried at 110° C. for 1 minute, then dried by being exposed in a UV exposure machine [Fusion UV, F600V, 600 W/inch, H type lamp source] at a power set at 100%, at a speed of 15 m/min with an energetic ray of 250 mJ/cm$^2$, and at room temperature for 4 seconds, to afford a scratch-resistant layer with a coating thickness of about 6 μm. The scratch-resistant layer was tested for various properties, and the test results obtained are shown in Table 1 below.

EXAMPLE 3

The Amount of Radiation Curable Resin (38.08×80%) is 600 wt % on the Basis of the Amount of Thermal Plastic Resin (16.92×30%)

Preparation of Scratch-Resistant Layer

To a 250 ml glass bottle, 25 g ethyl acetate was added as a solvent. With high speed stirring, the following substances were added in sequence: 38.08 g of the radiation curable resin formulation A prepared in Preparation Example 1 (with a solids content of about 80%, Eternal Company); a thermal plastic resin: 16.92 g of polymethacrylic polyol resin [Eterac 7365-s-30, Eternal Company] (with a solids content of about 30%, and a glass transition temperature Tg of 95° C.); and 4.2 g of an anti-static agent [GMB-36M-AS, Marubishi Oil Chem. Co., Ltd] (with a solids content of about 20%) to prepare a coating composition with a total weight of about 85 g and solids content of about 33%. The coating composition was coated on a PET substrate of 188 μm in thickness with a RDS Bar Coater #8, dried at 110° C. for 1 minute, then dried by being exposed in a UV exposure machine [Fusion UV, F600V. 600 W/inch, H type lamp source] at a power set at 100%, at a speed of 15 m/min with an energetic ray of 250 mJ/cm$^2$, and at room temperature for 4 seconds, to afford a scratch-resistant layer with a coating thickness of about 6 μm. The scratch-resistant layer was tested for various properties, and the test results obtained are shown in Table 1 below.

EXAMPLE 4

The Amount of Radiation Curable Resin (41.25×80%) is 800 wt % on the Basis of the Amount of Thermal Plastic Resin (13.75×30%)

Preparation of Scratch-Resistant Layer

To a 250 ml glass bottle, 25 g ethyl acetate was added as a solvent. With high speed stirring, the following substances were added in sequence: 41.25 g of the radiation curable resin formulation A prepared in Preparation Example 1 (with a solids content of about 80%, Eternal Company); a thermal plastic resin: 13.75 g of polymethacrylic polyol resin [Eterac 7365-s-30, Eternal Company] (with a solids content of about 30%, and a glass transition temperature Tg of 95° C.); and 4.2 g of an anti-static agent [GMB-36M-AS, Marubishi Oil Chem. Co., Ltd] (with a solids content of about 20%) to prepare a coating composition with a total weight of about 85 g and solids content of about 38%. The coating composition was coated on a PET substrate of 188 μm in thickness with a RDS Bar Coater #8, dried at 110° C. for 1 minute, then dried by being exposed in a UV exposure machine [Fusion UV, F600V, 600 W/inch, H type lamp source] at a power set at 100%, at a speed of 15 m/min with an energetic ray of 250 mJ/cm$^2$, and at room temperature for 4 seconds, to afford a scratch-resistant layer with a coating thickness of about 6 μm. The scratch-resistant layer was tested for various properties, and the test results obtained are shown in Table 1 below.

COMPARATIVE EXAMPLE 1

A commercially available protective diffusion film with a thickness of 195 μm and having organic particles with a particle size distribution from 1 to 10 μm in the diffusion layer on the substrate surface [PBS632L, Keiwa Co.] was tested for various properties, and the results obtained are shown in Table 1 below.

COMPARATIVE EXAMPLE 2

A commercially available protective diffusion film with a thickness of 200 μm and having polymethyl methacrylate particles with a particle size distribution from 1 to 20 μm in the diffusion layer on the substrate surface [D117VGZ, Tsujiden Co.] was tested for various properties, and the results obtained are shown in Table 1 below.

COMPARATIVE EXAMPLE 3

A commercially available protective diffusion film with a thickness of 205 μm and having organic particles with a particle size distribution from 1 to 10 μm in the diffusion layer on the substrate surface [PBS072, Keiwa Co.] was tested for various properties, and the results are shown in Table 1 below.

Test Method A:

Film Thickness Test: The thicknesses of the films of Examples 1 to 4 and Comparative Examples 1 to 3 were measured with a coating thickness gauge (PIM-100, TESA Corporation) under 1 N pressing contact. The results were recorded above.

Testing Method B:

Pencil Hardness Test: According to JIS K-5400 method, the surfaces of the test samples (for the comparative examples, the scratch-resistant layers on the backside of the substrate) were tested with a Pencil Hardness Tester [Elcometer 3086, SCRATCH BOY], using Mitsubishi pencil (2H and 3H). The results of the tests are shown in Table 1 below.

Surface Resistivity Test: The surface resistivity of the surfaces of the samples (for the comparative examples, the scratch-resistant layers on the backside of the substrate) was measured with a Superinsulation Meter [EASTASIA TOADKK Co., SM8220&SME-8310, 500 V]. The testing conditions were: 23±2° C., 55±5% RH. The results of the test are shown in Table 1 below.

Wear Resistance Test: A Linear Abraser [TABER 5750] was used, and a 3M BEF-III-10T film (20 mm length×20 mm width) to be tested was affixed on a 300 g platform (area: 20 mm length×20 mm width). The prism structure layer of the film faced upwards, so as to test the wear resistance under high pressure of the scratch-resistance layers of films under the test. The wear resistance test was performed in 10 cycles/min with a test path of 2 inches and a speed of 10 cycles/min. The results of the test are listed in Table 1 below.

Warp Test: The test films were cut into level films with 100 mm length×100 mm width, placed in an oven at 120° C. for 10 min, and then taken out and left at room temperature (for the comparative examples, the scratch-resistant layers on the backside of the substrate faced upwards). After being cooled down to the room temperature, the films were measured for warping level on the four corners with a gap gauge (recording unit: millimeter (mm), recording manner: for example, 0,0: 0;0). and thereby, the test samples were evaluated for heat resistance and warp resistance properties. The results of the test are listed in Table 1 below.

TABLE 1

| | Example 1 | Example 2 | Example 3 | Example 4 | Comparative Example 1 | Comparative Example 2 | Comparative Example 3 |
|---|---|---|---|---|---|---|---|
| Pencil Hardness (scratch-resistant layer) | 3H | 3H | 3H | 3H | 2H | 2H | 3H |
| Surface Resistivity Ω/□ (scratch-resistant layer) | $3.10 \times 10^{11}$ | $7.3 \times 10^{10}$ | $6.19 \times 10^{11}$ | $3.39 \times 10^{11}$ | $1.3 \times 10^{12}$ | $1.8 \times 10^{12}$ | $2.6 \times 10^{16}$ |
| Wear Resistance Test of Scratch-Resistant Layer | No Scratch | No Scratch | No Scratch | No Scratch | Severe Scratch | Light Scratch | Severe Scratch |
| Warp Test (mm) (120° C., 10 min) | 0; 0; 0; 0 | 0; 0; 0; 0 | 0; 0; 0; 0 | 0; 0; 0; 0.1 | 0.1; 0; 0.1; 0.1 | 0.1; 0.1; 0.1; 0.1 | 0; 0; 0; 0 |

According to the results of the examples and the comparative examples shown in Table 1, the scratch-resistant films according to the present invention possess good anti-static property and high hardness property and have preferred surface evenness without warping.

What is claimed is:

1. A coating composition comprising:
   (a) a thermal plastic resin selected from the group consisting of a polycycloolefin resin, polyester resin, polyacrylate resin, and a mixture thereof, wherein the thermal plastic resin has a glass transition temperature of from 80° C. to 250° C.; and
   (b) a radiation curable resin formulation comprising:
      (b1) at least one mono- or multi-functional acrylic monomer as a polymerization unit, wherein the acrylic monomer is selected from the group consisting of an acrylic acid monomer and an acrylate monomer,
      (b2) an oligomer having an ethylenically unsaturated group; and
      (b3) a photoinitiator,
   wherein components (b1), (b2) and (b3) of the radiation curable resin formulation are present in an amount of 220-1000% by weight on the basis of the weight of the thermal plastic resin.

2. The coating composition as claimed in claim 1, wherein the components (b1), (b2) and (b3) of the radiation curable resin formulation are present in an amount of 250-500% by weight on the basis of the weight of the thermal plastic resin.

3. The coating composition as claimed in claim 1, wherein the thermal plastic resin has at least one functional group selected from the group consisting of hydroxy, carboxy, amido, urethano, and epoxy, and a combination thereof.

4. The coating composition as claimed in claim 1, wherein the thermal plastic resin is a polyacrylate resin.

5. The coating composition as claimed in claim 1, wherein the polyacrylate resin contains a polymerization unit derived from acrylic acid, methacrylic acid, methyl acrylate, methyl methacrylate, ethyl acrylate, ethyl methacrylate, butyl acrylate, butyl methacrylate, iso-butyl acrylate, iso-butyl methacrylate, iso-octyl acrylate, iso-octyl methacrylate, cyclohexyl acrylate, cyclohexyl methacrylate, glycidyl acrylate, glycidyl methacrylate, hydroxyethyl acrylate, hydroxypropyl acrylate, 2-hydroxyethyl acrylate, 2-hydroxyethyl methacrylate, 2-hydroxypropyl acrylate, 2-hydroxypropyl methacrylate, or hydroxypropyl methacrylate or a mixture thereof.

6. The coating composition as claimed in claim 1, wherein the thermal plastic resin has an average molecular weight in the range from $10^4$ to $2\times10^6$.

7. The coating composition as claimed in claim 1, wherein the mono- or multi-functional acrylic monomer is an acrylate monomer.

8. The coating composition as claimed in claim 7, wherein the acrylate monomer is an acrylate monomer, a methacrylate monomer, a urethane acrylate monomer, a polyester acrylate monomer, or an epoxy acrylate monomer.

9. The coating composition as claimed in claim 7, wherein the acrylate monomer is a methacrylate monomer.

10. The coating composition as claimed in claim 1, wherein the oligomer having an ethylenically unsaturated group is an acrylate oligomer selected from the group consisting of urethane acrylates, epoxy acrylates, novolac epoxy acrylate, polyester acrylates, acrylates and a mixture thereof.

11. The coating composition as claimed in claim 1, wherein the oligomer having an ethylenically unsaturated group has a molecular weight in the range from $10^3$ to $10^4$.

12. The coating composition as claimed in claim 1, wherein the photoinitiator is selected from the group consisting of benzophenone, benzoin, 2-hydroxy-2-methyl-1-phenylpropan-1-one, 2,2-dimethoxy-1,2-diphenylethan-1-one, 1-hydroxy cyclohexyl phenyl ketone, and 2,4,6-trimethylbenzoyl diphenyl phosphine oxide, and a mixture thereof.

13. The coating composition as claimed in claim 1, wherein the photoinitiator is benzophenone or 1-hydroxy cyclohexyl phenyl ketone.

14. The coating composition as claimed in claim 1, further comprising an anti-static agent selected from the group consisting of ethoxy glycerin fatty acid esters, quaternary amine compounds, aliphatic amine derivatives, polyethylene oxide, siloxane, and alcohol derivatives.

15. The coating composition as claimed in claim 1, further comprising inorganic particulates selected from the group consisting of zinc oxide, zirconia, silicon dioxide, titanium dioxide, alumina, calcium sulfate, barium sulfate, and calcium carbonate, and a mixture thereof.

16. The coating composition as claimed in claim 1, further comprising diffusion particles selected from those of an acrylate resin, a methacrylate resin, a styrene resin, a urethane resin, or a silicone resin, or a mixture thereof.

17. The coating composition as claimed in claim 1, further comprising a solvent selected from the group consisting of a benzene compound, an ester, and a ketone, and a mixture thereof.

* * * * *